United States Patent
Hiyama et al.

[15] 3,681,564
[45] Aug. 1, 1972

[54] AUTOMATIC OSCILLATING ARC WELDING METHOD AND APPARATUS

[72] Inventors: Yoshio Hiyama, Tokyo; Haruo Fujita, Kawasaki; Eiichi Tsunetomi, Tokyo; Kan Okada; Satoshi Kude, both of Funabashi, all of Japan

[73] Assignee: Nippon Steel Corporation, Tokyo, Japan

[22] Filed: April 6, 1971

[21] Appl. No.: 131,762

Related U.S. Application Data

[63] Continuation of Ser. No. 829,195, Jan. 2, 1969, abandoned.

[30] Foreign Application Priority Data

June 7, 1968 Japan..........................43/38689

[52] U.S. Cl..................219/125 R, 219/61, 219/137
[51] Int. Cl. ...............................................B23k 9/12
[58] Field of Search..........219/74, 76, 105, 124, 125, 219/130, 60 A, 60 R, 61, 137; 228/45

[56] References Cited

UNITED STATES PATENTS

| | | | |
|---|---|---|---|
| 3,035,156 | 5/1962 | Staley | 219/125 |
| 1,580,020 | 4/1926 | Cutler et al. | 219/125 |
| 3,665,363 | 1/1954 | Wepfer | 219/130 |

*Primary Examiner*—J. V. Truhe
*Assistant Examiner*—L. A. Schutzman

[57] ABSTRACT

Method of operating an apparatus for automatic arc welding with the welding head oscillating to form figure eight patterns, such oscillating motion being carried out by compounding, on an oscillating motion compounding shaft, two reciprocating motions in different directions, which is converted into one original rotation, such compounding and conversion being done in one and the same apparatus.

6 Claims, 14 Drawing Figures

PATENTED AUG 1 1972

YOSHIO HIYAMA,
HARUO FUJITA,
EIICHI TSUNETOMI,   : INVENTORS
kan okada and SATOSHI KUDE, BY *Wenderoth, Lind & Ponack*

ATTORNEYS

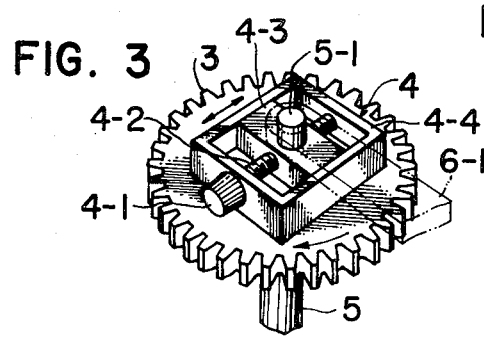
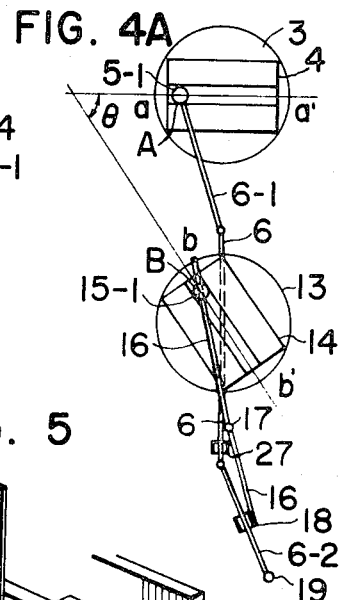

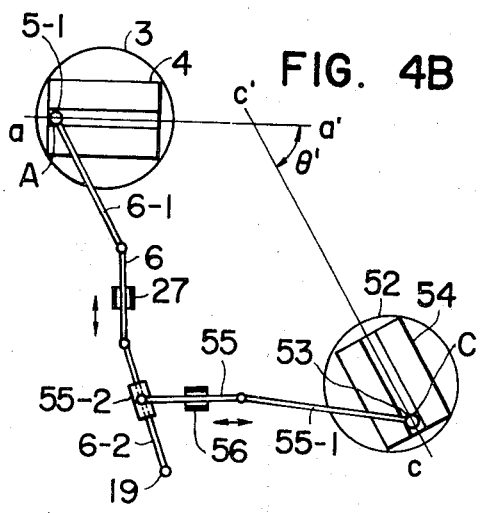
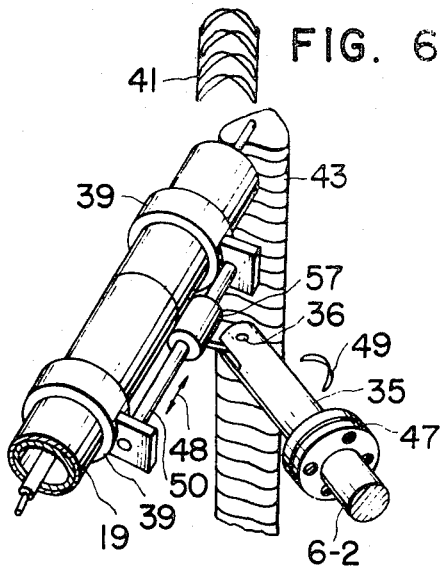
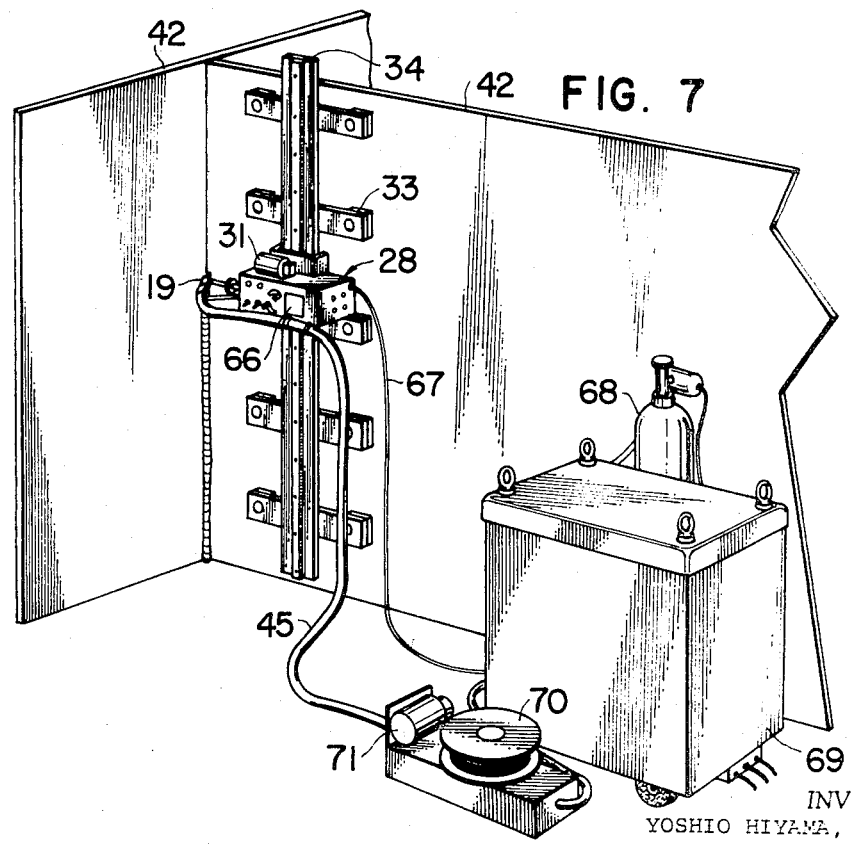

FIG. 8
① 8    ⑤ ○
② ⊃    ⑥ /
③ ⟩    ⑦ ○
④ ○    ⑧ |
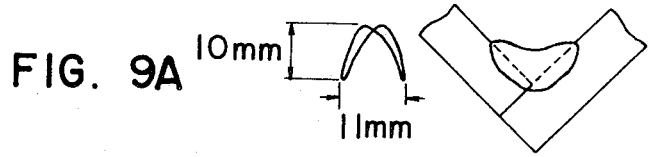
FIG. 9A
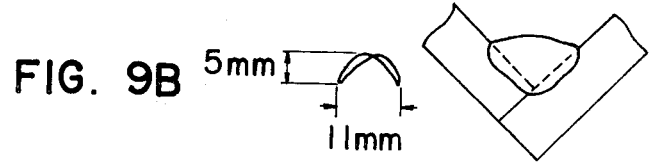
FIG. 9B
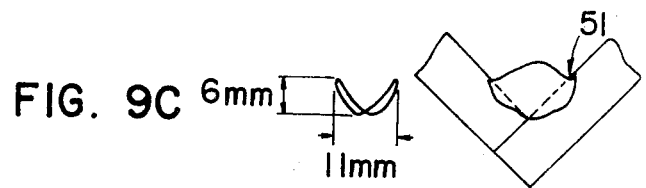
FIG. 9C
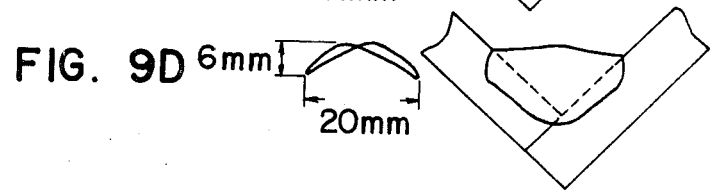
FIG. 9D
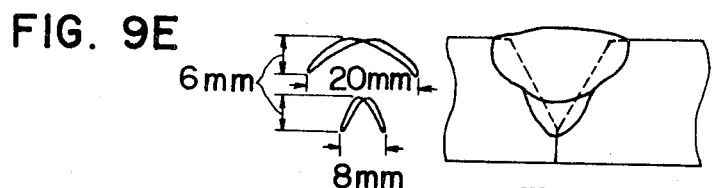
FIG. 9E
YOSHIO HIYAMA,
HARUO FUJITA,
EIICHI TSUNETOMI,
KAN OKADA and
SATOSHI KUDE : INVENTORS
BY Wenderoth Lind & Ponack
ATTORNEYS

AUTOMATIC OSCILLATING ARC WELDING METHOD AND APPARATUS

This application is a streamlined continuation of application Ser. No. 829,195, filed Jan. 2, 1969, now abandoned.

BACKGROUND OF THE INVENTION

1. Field of the Invention

The present invention relates in general to an automatic arc welding apparatus, and more particularly an apparatus for automatic arc welding with the welding head oscillating to form any desired pattern.

2. Description of the Prior Art

It has been known that in high speed welding, build up welding, multi-layered welding by using an apparatus for automatic arc welding, the use of automatic oscillating motion of the welding head produces better shapes of beads. However, such automatic oscillating motion is limited to such simple patterns as reciprocation, circles and triangles and it is impossible with the conventional apparatuses, to give to the welding head any oscillating motion to form such complicate patterns as 8-shape and U-shape patterns. There has long been a need for one and the same apparatus for giving to the welding head an oscillating motion to form any such complicated pattern as 8-shape, U-shape and ellipse shape, as well as reciprocating, circular and triangle motions.

SUMMARY OF THE INVENTION

An object of the present invention is to meet the above need by providing an apparatus for automatic arc welding using a welding head which can be given oscillating motions to form such complicated patterns as 8-shape, U-shape and ellipse shape, thereby carrying out fillet, butt joint and build up weldings easily with the production of better-appearance beads.

Another object of the present invention is to provide an automatic arc welding apparatus comprising a gear system and two eccentric rotation systems, and capable, by itself, of giving to the welding head an oscillating motion to form such complicated patterns as 8-shape, U-shape and ellipse shape, as well as reciprocating and circular motions.

Another object of the present invention is to provide an and apparatus for automatic fillet arc welding in the vertical position, thereby making welding operations easy and providing beads having an excellent appearance and long leg length.

In order to attain these objects the present invention comprises an automatic arc welding apparatus giving to the welding head an oscillating motion to form such complicated patterns as 8-shape, U-shape and ellipse shape, such oscillating motion being made by compounding, on an oscillating motion compounding shaft, two reciprocating motions in different directions which are converted into one rotation. The automatic oscillating arc welding apparatus comprising a unit for converting an original rotation into two reciprocating motions in different directions, a unit for compounding, on an oscillating motion compounding shaft, the reciprocating motions produced in the above unit, the welding head connected with the above shaft, etc.

BRIEF DESCRIPTION OF THE DRAWINGS

FIG. 3 is a perspective view of the reciprocating motion distance adjuster which is a main component of the apparatus shown in FIG. 1;

FIG. 4(A) is a diagram of the process of compounding reciprocating motion and circular reciprocating motion on the welding head in the apparatus according to the present invention shown in FIG. 1;

FIG. 4(B) is another diagram of the process of compounding reciprocating motions according to the present invention;

FIG. 5 is a perspective view of an embodiment of the apparatus in operation according to the present invention;

FIG. 6 is detailed view of part of FIG. 5;

FIG. 7 is general view of the operation shown in FIG. 5;

FIG. 8 shows some patterns formed by oscillating motions of the welding head according to the present invention and FIGS. 9a–9e are cross sections of beads formed by fillet welding in a vertical position carried out with the apparatus of the present invention.

DESCRIPTION OF THE PREFERRED EMBODIMENT

Figure 1:
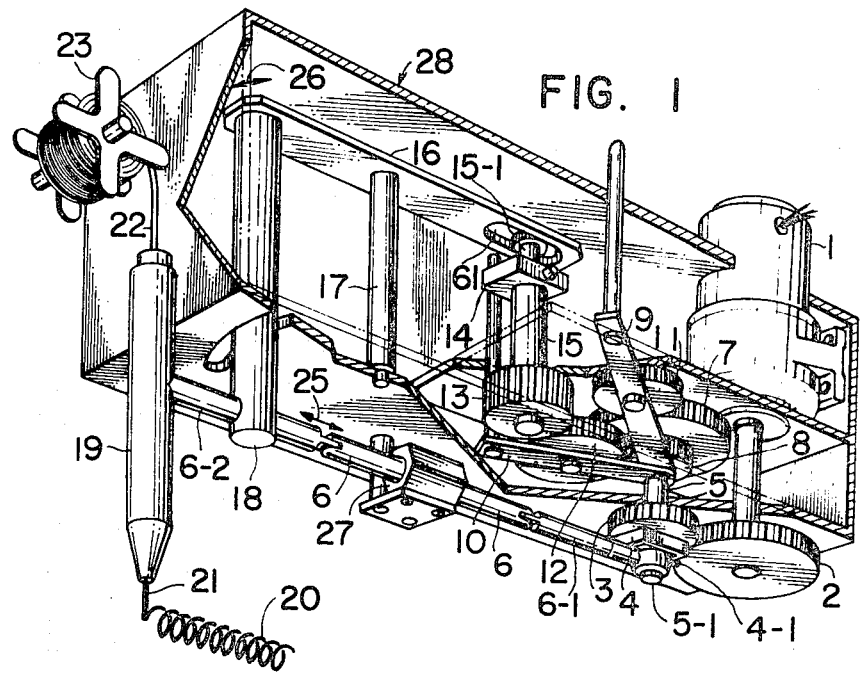
FIG. 1 is a perspective view of an embodiment of the apparatus of the present invention.
Figure 2:
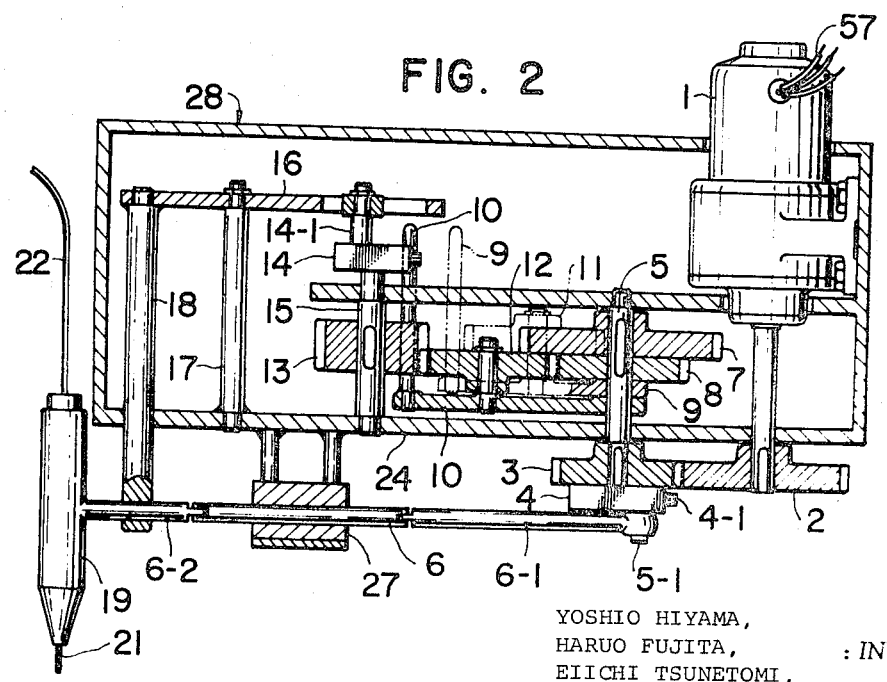
FIG. 2 is a side view, partly in section, of the apparatus shown in FIG. 1.

In FIG. 1 and FIG. 2 is shown the unit for converting an original rotation into two reciprocating motions in different directions, which is a main component of the apparatus of the present invention.

Said rotation is generated by a motor 1. The shaft of said motor 1 has a gear 2 fixed thereon; said gear 2 being engaged with another gear 3 fixed on a rotation shaft 5. On said gear 3 is fixed also a reciprocating motion distance adjuster 4. As shown in detail in FIG. 3, said adjuster has a threaded shaft 4-2 rotatably mounted in box 4—4 on the gear 3. A body 4-3, movable in box 4—4 is threaded on shaft 4-2. By turning a knob 4-1 the moving body 4-3 is moved by the turning of the threaded shaft 4-2 in the direction of the diameter of the gear 3 in the direction of the arrow. A projecting axle 5-1 is mounted on said moving body 4-3, and to this axle is rotatably connected the oscillating shaft 6-1. Because of this structure, it is possible to obtain any desired degree of eccentricity of the projecting axle 5-1 with respect to the rotation shaft 5 by adjusting the position of said moving body. Therefore, the rotation of the gear 3 causes the projecting axle 5-1 to rotate around said shaft 5, causing the oscillating shaft 6-1 to make oscillating and reciprocating motions.

On the other hand, the rotation of said rotation shaft 5 generated by the motor 1 is transmitted through the gears 8, 12, and 13 to another rotation shaft 15, on which is provided a circular reciprocating distance adjuster 14. This adjuster 14 has the same structure as the above adjuster 4; it has a projecting axle 15-1 with its tip set inside a long hole on the plate 16. When the shaft 15 rotates, said projecting axle 15-1 rotates around the shaft 15, causing circular reciprocating motion of the plate 16 around the fixed shaft 17, in an direction of arrow 26. Said reciprocating motion is transmitted to the oscillating motion compounding shaft 6-2 through the shaft 18 fixed on the plate 16. As mentioned above, the circular motion of the gear 2 generated by the motor 1 is converted into a linear reciprocating motion transmitted through the axle 5–1 and the oscillating shaft 6–1 to shaft 6 and thence to shaft 6–2 from one direction and into a circular reciprocating motion of the plate 16 transmitted through the shaft 18 to the shaft 6–2 from another direction; that is, two reciprocating motions of different directions are given to the oscillating motion compounding shaft 6–2.

In the above case, the rotation of the gear 3 is transmitted to the rotation shaft 5, and then to the gear 13 through the gear 8 provided on said rotation shaft 5 and other intermediate gears; in order to change the rotation ratio between the rotation shafts 5 and 15, said gear 12 is fixed on a reciprocating motion ratio changing lever 10; a gear 7 is mounted on the rotation shaft 5; and a gear 11 engaged with said gear 7 is fixed on a reciprocating motion ratio changing lever 9.

The unit for compounding the above two reciprocating motions in different directions at the welding head 19 works as follows:

In FIG. 1 and FIG. 2, the oscillating shaft 6–1 is connected, at other end, with the reciprocating shaft 6. Said shaft 6 is slidably mounted in a supporting material 27 fixed on the frame 24. At the other end, said shaft 6 is connected to the oscillating motion compounding shaft 6–2, which slides through the circular reciprocating shaft 18. The plate 16 has its middle part rotatably mounted on the fixed shaft 17 fixed on the frame 24; and it has the other end connected with the circular reciprocating shaft 18. Thus, the circular reciprocating motion of the circular reciprocating shaft 18 and the linear reciprocating motion given to shaft 6 by the oscillating shaft 6–1 are compounded at the oscillating motion compounding shaft 6–2. At the end of the oscillating motion compounding shaft 6–2 is provided the welding head 19. Said two reciprocating motions in different directions are compounded so as to form a desired oscillating pattern at the tip 21 of the welding head 19.

In FIG. 1 and FIG 2 are also shown welding wire 22, and a reel 23 from which it is unwound.

The following is the description of operation of the apparatus according to the present invention. As shown in FIG. 4 (A), the axle 5–1 of the reciprocating motion distance adjuster 4 is set at an appropriate position A, and the axle 15–1 of the circular reciprocating motion distance adjuster 14 is set at an appropriate position B. In this case, an angle $\theta$ is formed by the directions $a—a'$ and $b—b'$ of respective motions of the projecting axles of the adjusters. In this example, the relative angle $\theta$ is an appropriate value obtained by turning the gears 3 and 13. Then, the reciprocating motion ratio changing lever 9 or 10 is operated to move the gear 11 or 12 into engagement between gears 8 and 13 so as to obtain the desired reciprocating motion ratio. In the example shown in FIG. 1 and FIG. 2, the gears 8 and 12 are engaged with each other by using the lever 10.

After the above pre-arrangement, the welding head 19 is positioned at the part to be welded, and the motor is set in motion, thus welding operation starts. The rotation of the motor 1 is transmitted to the gear 3 through the driving gear 2, and that of the gear 3 makes the reciprocating motion distance adjuster 4 rotate around the rotation shaft 5. Also, the axle 5–1 in the adjuster 4 circles at the position A around the shaft 5, such circular motion causes oscillating and reciprocating motions of the oscillating shaft 6–1 set on said axle 5–1, which motions are converted into the linear reciprocating motion of the reciprocating shaft 6 in the direction of its length (marked with an arrow 25 in FIG 1). The rotation of the gear 3 is transmitted to the gear 8 on shaft 5 and also to the intermediate gear 12, and these gears cause rotation of the gear 13. The rotation of said gear 13 makes the shaft 15 rotate, causing rotation of the circular reciprocating motion distance adjuster 14. As the axle 15–1 is fixed at an appropriate position on said adjuster 14, said axle 15–1 circles at that position around the shaft 15 in accordance with the rotation of the adjuster 14. As the tip of the projection axle 15–1 is set in the long hole on the plate 16, the circular motion of the projection axle 15–1 causes circular reciprocating motion in the direction marked with an arrow 26 in FIG. 1 at the circular reciprocating shaft 18 provided at the other end of the plate 16, which pivots around the supporting shaft 17 of the plate 16. Said circular reciprocating shaft 18 gives circular reciprocating motion to the oscillating motion compounding shaft 6–2 in addition to the reciprocating motion which has been given thereto, thus, the welding head 19 provided at the tip of said oscillating motion compounding shaft 6–2 starts a compounded motion.

As mentioned above, the gist of the present invention is that rotation generated by the motor 1 is converted into two reciprocating motions in different directions, which are compounded at the oscillating motion compounding shaft 6–2 connected with the welding head 19, causing an oscillating motion of the welding head 19 forming such patterns as 8-shape, U-shape and ellipse shape. The automatic oscillating motion compounding apparatus is capable, by itself, of forming many complicated patterns.

This apparatus contains a mechanism for adjusting the distances of reciprocating and circular reciprocating motions by moving the projecting axles of the reciprocating motion distance adjusters in the direction of the diameter of the gears, a mechanism for changing the reciprocating motion ratio, containing such items as the reciprocating motion changing lever and transmitting gears, a mechanism for changing the relative angle formed by the directions of motions of the projecting axles provided respectively on the reciprocating motion distance adjuster and the circular reciprocating motion distance adjuster, and other such mechanisms.

The manner of obtaining various patterns with the tip 21 of the welding head 19 oscillating as described above, is as follows:

1. When the rotation of the speed of rotation between the reciprocating motion driving gear 3 and the circular reciprocating motion driving gear 13, is adjusted so as to be 1 : 2 by appropriately shifting the gears 11 and 12 by the reciprocating motion ratio changing mechanism 9 and 10, and, the relative angle $\theta$ formed by the directions $a — a'$ and $b — b'$ of the motions of the projecting axles, as shown in FIG. 4 (A), is set at 0°, the motion of the tip 21 of the welding head 19 forms a pattern of an 8-shape as shown in ① of FIG. 8.

2. When $\theta$ is set at 90° and the other conditions described above in (1) are the same, a patter of a U-shape lying on its side formed as shown in FIG. 8②.

3. When $\theta$ is set between 0° and 90°, and the other conditions are as in ①, a pattern of a deformed 8-shape is formed as shown in FIG. 8③.

4. When the ratio of the speed of rotation between the reciprocating motion driving gear 3 and the circular reciprocating motion driving gear 13, is set at 1 : 1 by appropriately shifting the gears 11 and 12 by the reciprocating motion distance changing mechanism 9, and 10, and the relative angle $\theta$ between the directions $a - a'$ and $b - b'$ of the motions of the projecting axles shown in FIG. 4 (A) is set at 0°; and the distance of the reciprocating motion is made equal to that of the circular reciprocating motion by using the motion distance adjusters 4 and 14, then the tip 21 of the welding head 19 takes a motion in a circular pattern as shown in FIG. 8④.

5. When the distance of the reciprocating motion is changed, with the other conditions left the same as mentioned above in ①, the motion is an ellipse, as shown in FIG. 8⑤.

6. When $\theta$ is set at 90°, and the other conditions are the same as in ④, the tip of the welding head moves with a slant reciprocating motion, as shown in FIG. 8⑥.

7. When $\theta$ is set between 0° and 90°, and the other conditions are the same as in 4 the tip moves in a pattern of a slant ellipse, as shown in FIG. 8⑦.

8. When the axis of the axle 15–1 set in the circular reciprocating motion distance adjuster 14 corresponds with the axis 15 of the circular reciprocating motion driving gear 13, the motion of the tip is in a pattern as shown in FIG. 8⑧.

The above patterns are fundamental patterns which are obtained when no moving carriage is used. If a moving carriage 32 is used in the case of the circular motion of the tip of the welding head as mentioned in (4) above, a pattern as shown at 20 of FIG. 1 is obtained.

In the above described embodiment of an apparatus for producing oscillating motion of the welding head, the motion is achieved by compounding a linear reciprocating motion and a circular reciprocating motion. However, the objects of the present invention can be also attained even by compounding two linear reciprocating motions in different directions, instead of compounding, as mentioned above, the linear reciprocating motion and the circular reciprocating motion. This is shown in FIG. 4 (B) illustrating another embodiment of the process of compounding reciprocating motions, in which the circular motion of the projecting axle 53 is converted into a linear reciprocating motion through the oscillating motor shaft 55–1, the reciprocating motion shaft 55, the oscillating motion transmitting axle 55–2, etc., and the so formed reciprocating motion is conveyed to said oscillating motion compounding shaft 6–2 from a direction at an angle to that of the movement of said reciprocating motion shaft 6, so as be compounded with another linear reciprocating motion. In the figure, 56 designates a bearing; and 54 designates a unit for adjusting the distance of movement of the reciprocating motion. The gear 52 is rotated by the gear 3 through a reciprocating motion ratio changing device by an appropriate means such as a bevel gear and a combination of rotation shafts. (This mechanism is not ellustrated.)

In FIG. 4 (B), the reciprocating motion shafts 6 and 55 are positioned perpendicularly to each other, but the relative angle $\theta'$ formed by the moving directions $a$ — $a'$ and $c$ — $c'$ of respective projecting axles for said shafts, corresponds to the relative angle $\theta$ shown in FIG. 4 (A). Therefore, the relative angle $\theta'$ has the same effect as the relative angle $\theta$.

As mentioned above, the present invention covers a number of combinations of two directions of linear reciprocating motions and circular reciprocating motions, and a number of processes of compounding them.

If the apparatus according to the present invention is used, it is possible to carry out even such weldings as a welding of high efficiency attained by using the oscillating motion of the welding head and, for example, a vertical fillet welding of 5 to 20 mm in the leg length of bead, which is impossible to obtain by the conventional methods, with the apparatus by itself, only by changing such welding conditions as the patterns of oscillating motion and moving speed, thereby producing beads of good appearance very easily. Conventionally, such weldings have been carried out only manually by technicians proficient in this art. Even in such case, the leg length of the thus obtained bead is limited to a maximum of about 10 mm; and for a leg length more than 10 mm, a multilayered welding has been carried out. Regarding fillet welding, it can be easily carried out by adding an arc welder orienting device to the automatic oscillating arc welding apparatus according to the present invention.

As shown in FIG. 5, FIG. 6 showing its details and FIG. 7 showing a general view, an embodiment of the apparatus for carrying out automatic fillet welding in the vertical position, using also this arc welder orienting device, works, as follows:

The oscillating motion forming for example, the pattern of a nearly side-ways 8-shape with both ends lowered, as at 49, is compounded through the adjustment of the oscillating motion ratio changing lever 9 in the automatic oscillating arc welding apparatus 28 and also the adjuster, is transmitted to the oscillating motion compounding shaft 6–2 54, and and also to the welding head supporting shaft 35 through the coupling 47 having an insulating material within it. One end 36 of said welding head supporting shaft 35 is connected with the slider 57 which slides, as shown by an arrow 48, on the sliding shaft fixed on the welding head supporting ring 39, so that the end can rotate freely on nearly the same level as the slider. The welding head 19 is connected with the welding head supporting arm 37 fixed on the automatic oscillating arc welding apparatus 28 so that the welding head supporting ring 38 can rotate freely on nearly the same level. Therefore, the tip of the welding head 19 takes an oscillating motion in such manner that the oscillating motion compounded on the oscillating motion compounding shaft 6–2, is transmitted to the welding head 19 through the welding head supporting shaft 35, slider 57, the sliding shaft 50, and the welding head supporting ring, and the motion of the welding head is a motion that is again compounded of the circular motion which is produced with the joint of the welding head supporting arm 37 and ring 38 as the supporting point in addition to the circular reciprocating motion. By changing the length of the welding head supporting arm 37, the angle of orientation of the welding head 19 can be varied, making it possible to direct the welding head 19 to the center of any groove angles for any weldings such as fillet welding and butt joint welding. Through the adjustment of the rotation of the driving motor 31 of the carriage 32, the welding carried out as the carriage is moving in the direction marked with an arrow 40 is oscillating motion of the welding head, as shown at 41. Any adjustment of the distance of reciprocating motion is made manually with the knobs 4–1 and 14–1 respectively of the adjusters 4 and 14 inside the box, in which the opening 66 is provided for the hand of the operator. The oscillating cycle is adjusted with the knob 61, 63 and 64 for the respective switches of the motors 1 and 31 respectively for the oscillating motion producer 28 and the carriage 32. 65 indicates the switch for the electric source, and 67 indicates the cord from the source. 34 in FIG. 5 indicates a rail for the carriage 32 attached to the base material 42 with a permanent magnet 33. The welding head 19 shown is for semi-automatic welding, with a conduit cable 45 for leading $CO_2$ gas, welding wire 46. 43 indicates welding metal. Needless to say, a spatter preventive board must be provided for the sliding part of the welding head 19. In FIG. 7, 68 indicates a shield gas bomb; 69 indicates the source of electric power for welding; 70 indicates the reel for winding the wire 46; and 71 indicates the motor for supplying the wire 46.

The automatic arc welder orienting device according to the present invention is useful not only in orienting the welding head, but also in preventing welding defects such as undercut at the toe of a bead, as it makes a circular arc motion at the cross-section rectangular to the welding line. This device can be used for the reciprocating motion in one direction as well as compounded oscillating motions.

The results of the automatic fillet and butt welding in the vertical position, using the automatic arc welder orienting device according to the present invention, together with the semi-automatic $CO_2$ gas welder and welding wire of 1.2 mm dia., are as follows:

In reference to FIG. 9 showing the cross sections of beads and the Table 1 concerning to welding conditions used for respective beads, the patterns A,B and D of a nearly sideways flat 8-shape, with both ends lowered are the best for the formation of beads having a good appearance and penetration. These patterns are followed by those of an upside down U-shape and a sideways 8-shape. However, it is found that the patterns of a nearly sideways 8-shape, with both ends raised as shown in FIG. 9 C, of U-shape, of a circle, of an ellipse, of simple harmonic motion, etc., produce welding in which the welding metal tends to gather at the center of the bead, causing a convex bead like a saddle, concurrently with undercut and poor penetration, therefore, showing that these patterns are not suited for automatic fillet welding in the vertical position. Also, in welding of long leg length as shown in D, and in butt joint welding in the vertical position, as shown in E, the result varies to some extent according to welding current, welding speed and cyclic period of pattern formation, but for welding in the vertical position, the patterns of a nearly sideways 8-shape with both ends lowered and an upside down U-shape are the best suited, particularly those 1 – 10 mm high and of 0.1 – 1.0 cycle/sec. That is to say, if it is more than 10 mm high, even a pattern of a nearly sideways 8-shape with both ends lowered causes repetition of the movement of the arc spot from molten metal to the base material and vice versa in a short time. So, these patterns not only degrade the stability of the arc but also produce such defects as slag inclusion. If the pattern is less than 1 mm high, the motion forming such pattern turns out to be like simple harmonic motion, causing undercut and a convex bead like a saddle; moreover, the arc spot exists only on the bead surface part of the molten metal, so that it does not reach the corners of the beveling part, causing poor penetration.

TABLE 1

| Item Test | Cycle cycle/sec. | Welding Speed cm/min. | Current A | Voltage V |
|---|---|---|---|---|
| A | 0.4 | 8 | max 180 | 23–25 |
| B | 0.4 | 8 | max 180 | 23–25 |
| C | 0.4 | 8 | max 180 | 23–25 |
| D | 0.2 | 5 | max 210 | 23–25 |
| E | 0.2 | 5 | max 210 | 23–25 |
|   | 0.4 | 10 | max 170 | 23–25 |

We claim:
1. A method of operating a welding apparatus for welding two elements to each other, which elements have surfaces along which the weld is to be made, which surfaces are at an angle to each other, the method comprising moving the welding apparatus along said surfaces in the angle which the surfaces make with each other, stopping the apparatus periodically, and when the apparatus is stopped, operating driving means to supply rotary motion to two rotary motion converting means forming part of the welding apparatus for converting the rotary motion to reciprocal motion, one of the rotary motion converting means being driven at twice the speed of rotation of the other, each of the rotary motion converting means including a rotary member having a projecting axle adjustably mounted for diametrical adjusting movement thereon, an oscillating shaft pivotally connected at one end to the projecting axle and guide means engaging the guide shaft for guiding the other end thereof in reciprocating movement, at least one of the guide means guiding the oscillating shaft guided thereby for linear reciprocating motion, the welding apparatus further having a motion compounding shaft to which the other ends of the respective oscillating shafts are coupled and a welding head coupled to the motion compounding shaft, and setting the positions of the projecting axles on the rotary members of the rotary motion converting means and the angle between the diametrical adjusting movement so that the welding head is moved in a path having a shape generally in the shape of a thin figure eight lying on its side with the ends depending generally in the shape of an inverted U, so that the legs of the weld will lie along the surfaces to be welded.

2. The method as claimed in claim 1 in which the positions of the projecting axles on the rotary members and the angle between the diametrical adjusting movement are set so that the opening of the U faces the angle between the surfaces to be welded.

3. The method as claimed in claim 1 in which the positions of the projecting axles on the rotary members and the angle between the diametrical adjusting movement are set so that the opening of the U faces away from the angle between the surfaces to be welded.

4. A method of welding two elements to each other, which elements have surfaces along which the weld is to be made, which surfaces are at an angle to each other, the method comprising the steps of moving a welding apparatus along said surfaces in the angle which the surfaces make with each other, stopping the apparatus periodically, and when the apparatus is stopped, moving the weld head of the apparatus in a path having a shape generally in the shape of a thin figure eight lying on its side with the ends depending generally in the shape of an inverted U, so that the legs of the weld will lie along the surfaces to be welded.

5. A method as claimed in claim 4 in which the weld head is moved so that the opening of the U faces the angle between the surfaces to be welded.

6. A method as claimed in claim 4 in which the weld head is moved so that the opening of the U faces away from the angle between the surfaces to be welded.

* * * * *